Patented May 18, 1954

2,678,889

UNITED STATES PATENT OFFICE 2,678,889

METHOD FOR GLAZING ALUMINOUS BODIES

Josef Eidenberg, Hermann Belosa, and Eberhard Kühn, Dusseldorf-Heerdt, Germany

No Drawing. Application April 16, 1951, Serial No. 221,310

Claims priority, application Germany August 14, 1950

5 Claims. (Cl. 117—62)

The invention relates generally to a method for glazing shaped bodies of alumina and more particularly to such a glazing method which results in an extraordinarily thin and non abrasive coating on the surface of ceramic bodies, the alumina content of which is as high as 80 per cent and more.

It is well known in the art to glaze aluminous bodies, e. g. spark plugs or similar bodies, by using a mixture of glazing materials containing feldspar as main component. For many purposes, however, the glaze which is built up on the surface of the bodies from such glazing materials became too thick when the glazing method was chosen in the manner as known up to date. Due to the undesired thickness of the glaze the hardness and withstanding properties of the surface of the alumina bodies are diminished and the rather thick coatings tend—it is true—to burst off under certain circumstances.

It is an object of our invention to provide a process for the production of an extraordinarily thin, hard, withstanding and well adhering glaze on the surface of aluminous ceramic bodies.

Another object of our invention is to provide a process for glazing ceramic bodies, the alumina content of which amounts to 80 per cent and more.

Finally it is an object of the invention to provide a process for glazing ceramic bodies of 80 percent and more alumina with lower costs and using comparatively simple manufacturing means.

According to our invention the aluminous ceramic body is first covered with a layer of glazing materials free of alumina. Each of the components of this mixture of glazing materials is more or less soluble in acids or lyes. After the glazing materials have been laid on, the ceramic body by means of a suitable binder, the body is dried and afterwards fired at a moderately high temperature. By influence of the burning temperature the glazing materials adhering to the surface of the ceramic body begin to react with the alumina enriched ground to which they have close contact. The glazing mixture compounds react, by influence of heat, with the superficial portion of alumina from the ceramic body forming therewith a very thin and hard glaze which is no longer soluble in acids or lyes as before.

The glaze so formed adheres very well to the ceramic bodies' surface and simultaneously shows a remarkable smoothness. The surplus of glazing compounds which does not react with the alumina in the surface of the body to be glazed may be removed according to our invention in a very simple manner by treating the surface of the fired body with acids or lyes. The reason for the simple manner of operation is to be seen from the fact that the surplus of glazing materials does not lose its solubility during the burning period.

The thickness of the non-soluble glaze produced by the process as described is so small that the dimensions of the ceramic body carrying this glaze are in no way altered.

Another considerable advantage of the new glazing process according to the invention is to be seen from the fact that the thin glaze layer, after the removal of the surplus of glazing materials by an acid or lye, practically shows the withstanding and hardness of the alumina ground to which it adheres, some alumina of the ground having reacted with the glazing materials to form the non-soluble glaze under the influence of the firing temperature. Moreover, as has been mentioned above, it is of considerable advantage that the thin glaze resulting from the glazing process according to our invention, is completely insoluble in acids or lyes, so that the surplus of glazing materials may easily be removed from the ceramic body by means of suitable acids or alkaline solutions. The advantage mentioned last is of considerable importance for the industrial manufacturing of glazed bodies.

As the insoluble glaze is formed as a very thin layer on the ceramic body and as the surplus may be removed by a dissolving process, it is possible to carry or lay the glazing materials onto the surface of the body to be glazed without any precautions for regulating or ensuring the thickness desired of the glaze to be formed. The thickness of the insoluble glaze depends on the firing process and can be varied by altering the firing temperature and time interval to which the body is exposed.

We now have found that the process of the glazing of shaped aluminous bodies as described should not be limited to heavy sintered or fused alumina ceramic bodies. Moreover, the new process is applicable with the same considerable advantage also to less highly fired bodies which still show some porosity. This fact may be looked at as another demonstration for our glazing process which really forms a thin glaze on the bodies.

It may be mentioned that in our invention alumina bodies are such ceramic bodies which show a content of not less than 80% of pure alumina.

Our investigations showed that borosilicate and especially lead-borosilicate compounds are very suitable for forming the glazing mixture. It is, however, possible to use other compounds provided that these compounds are soluble in acids or lyes and provided that these compounds react with the alumina content of the ceramic body to form an insoluble glaze.

*Example 1*

A body of sintered or fused alumina was covered with a layer of glazing material consisting of 55.4% of red lead
30% of crystallized boric acid (containing water), and
14.6% of quartz (pulverised).

The compounds were thoroughly mixed with a suitable binder, such as dextrine. The body having been dried, it was fired at a temperature of about 1100° C. for a thirty minute period. After cooling the glazed body was treated with hot strong hydrochloric acid whereby the surplus of glazing materials was dissolved and removed. The surface of the ceramic body showed the smoothness and the brightness of a very thin glaze.

*Example 2*

The glazing mixture was composed of:

86.5% of crystallized boric acid
13.5% of pulverised quartz.

This mixture was suspended in petrol oil and then applied to the ceramic body. After firing and cooling the same the surplus of the glazing stuffs could be removed easily by hydrochloric acid or by strong soda lye.

It is apparent from the foregoing examples that the amount of quartz employed in the glazing mixture is about 15% of the composition and that the remainder of the composition comprises boric acid or boric acid and red lead. It is also apparent that the temperatures are in the order of about 1100° C.

The process according to the invention is not limited to aluminous bodies of certain shape or dimensions but shows considerable advantages as described above, in all such cases where a hard and withstanding and simultaneously smooth surface is to be produced as it is necessary in case of retorts, crucibles for chemical reactions, sticks or rods or small pipes of alumina etc.

Although we have described our invention with a certain degree of particularity it is understood that the present disclosure has been made only by way of example and that any changes or modifications in the details should be included in the following claims not departing from the spirit and scope of the invention as hereinafter claimed.

What we claim is:

1. A process for applying a tough, thin, and well adhering glaze to ceramic bodies containing at least 80% by weight of alumina comprising the steps of coating the surface of the ceramic body with a material comprising a mixture of about 15% quartz and the remainder selected from the group consisting of boric acid and a mixture of boric acid and red lead, firing the coated body at a temperature of about 1100° C. for about thirty minutes to react a portion of said material with the alumina at the surface of said body to form a thin acid and lye insoluble glaze on said body, and thereafter removing the unreacted material from said body by dissolving the same with a solvent selected from the group consisting of acids and lyes, said solvent being capable of dissolving only the unreacted material and being incapable of dissolving the insoluble glaze on said body wherein the dimensions of said ceramic bodies are substantially unchanged.

2. A process for applying a tough, thin, and well adhering glaze to ceramic bodies containing at least 80% by weight of alumina comprising the steps of coating the surface of the ceramic body with a material comprising a mixture of about 15% quartz and the remainder selected from the group consisting of boric acid and a mixture of boric acid and red lead, firing the coated body at a temperature of about 1100° C. for about thirty minutes to react a portion of said material with the alumina at the surface of said body to form a thin acid and lye insoluble glaze on said body and thereafter removing the unreacted material from said body by dissolving the same with hydrochloric acid wherein the dimensions of said ceramic bodies are substantially unchanged.

3. A process for applying a tough, thin and well adhering glaze to ceramic bodies containing at least 80% by weight of alumina comprising the steps of coating the surface of the ceramic body with a material comprising a mixture of about 15% quartz and the remainder selected from the group consisting of boric acid and a mixture of boric acid and red lead, firing the coated body at a temperature of about 1100° C. for about thirty minutes to react a portion of said material with the alumina at the surface of said body to form a thin acid and lye insoluble glaze on said body and thereafter removing the unreacted material from said body by dissolving the same with soda lye wherein the dimensions of said ceramic bodies are substantially unchanged.

4. A process for applying a tough, thin, and well adhering glaze to ceramic bodies containing at least 80% by weight of alumina comprising the steps of coating the surface of the ceramic body with a layer comprising a mixture of about 15% quartz and the remainder selected from the group consisting of boric acid and a mixture of boric acid and red lead, firing the coated body at a temperature in the order of 1100° C. to react only a portion of said material with the alumina at the surface of said body to form a thin acid and lye insoluble glaze on said body, and thereafter removing the unreacted material from said body by dissolving the same with a solvent selected from the group consisting of acids and lyes, said solvent being capable of dissolving only the unreacted material and being incapable of dissolving the insoluble glaze on said body wherein the dimensions of said ceramic bodies are substantially unchanged.

5. The process of claim 4 wherein said material contains a lead-boro-silicate.

References Cited in the file of this patent

UNITED STATES PATENTS

| Number | Name | Date |
| --- | --- | --- |
| 2,110,117 | Duldner | Mar. 1, 1938 |
| 2,225,161 | Deyrup | Dec. 17, 1940 |
| 2,277,005 | Ruse | Mar. 17, 1942 |
| 2,422,215 | Amberg | June 17, 1947 |
| 2,494,277 | Austin et al. | Jan. 10, 1950 |

FOREIGN PATENTS

| Number | Country | Date |
| --- | --- | --- |
| 558,550 | Great Britain | Jan. 10, 1944 |